(12) United States Patent
Lee et al.

(10) Patent No.: US 8,608,186 B2
(45) Date of Patent: Dec. 17, 2013

(54) ACTIVE ROLL CONTROL SYSTEM

(75) Inventors: Un Koo Lee, Seoul (KR); Sung Bae Jang, Suwon-si (KR); Pil Young Jeong, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/566,708

(22) Filed: Aug. 3, 2012

(65) Prior Publication Data

US 2013/0147143 A1 Jun. 13, 2013

(30) Foreign Application Priority Data

Dec. 12, 2011 (KR) .......................... 10-2011-0132820
Dec. 12, 2011 (KR) .......................... 10-2011-0132868

(51) Int. Cl.
*B60G 21/05* (2006.01)
(52) U.S. Cl.
USPC ............. 280/124.106; 280/5.502; 280/5.506; 280/5.511
(58) Field of Classification Search
USPC ................. 280/5.502, 5.506, 5.507, 5.511, 280/124.106, 124.13, 124.134, 124.149, 280/124.152; 267/188; 74/89.17
See application file for complete search history.

(56) References Cited

U.S. PATENT DOCUMENTS

| | | | |
|---|---|---|---|
| 4,892,329 A * | 1/1990 | Kozaki et al. ............... | 280/5.511 |
| 5,186,486 A * | 2/1993 | Hynds et al. ............ | 280/124.107 |
| 6,175,792 B1 | 1/2001 | Jones et al. | |
| 6,254,114 B1 * | 7/2001 | Pulling et al. ............ | 280/93.511 |
| 7,325,820 B2 * | 2/2008 | Allen et al. ............... | 280/124.15 |
| 7,377,529 B2 * | 5/2008 | Green ..................... | 280/124.107 |
| 8,398,092 B2 * | 3/2013 | Lee et al. .................... | 280/5.507 |
| 8,408,559 B1 * | 4/2013 | Lee et al. .................... | 280/5.508 |
| 2009/0288297 A1 * | 11/2009 | Schmidt et al. .......... | 29/898.052 |
| 2012/0306177 A1 * | 12/2012 | Thill ...................... | 280/124.152 |

FOREIGN PATENT DOCUMENTS

| | | |
|---|---|---|
| JP | 5-213040 A | 8/1993 |
| JP | 10-297312 A | 11/1998 |
| KR | 1998-045430 | 9/1998 |
| KR | 10-0521217 B1 | 10/2005 |
| KR | 10-0629799 B1 | 9/2006 |
| KR | 1020090098039 A | 9/2009 |

* cited by examiner

*Primary Examiner* — Paul N Dickson
*Assistant Examiner* — Timothy Wilhelm
(74) *Attorney, Agent, or Firm* — Morgan, Lewis & Bockius LLP (57) ABSTRACT

An active roll control system that may be adapted to actively control roll stiffness of a vehicle by adjusting a mounting position of a stabilizer link connecting a suspension arm with a stabilizer bar of the vehicle on the suspension arm according to a driving condition of vehicle may include a driving unit which including a housing connected with a side of the suspension arm, a rail plate disposed within the housing, and a connector movable along the rail plate, and a stabilizer link of which one end may be connected with an end of the stabilizer bar and the other end may be connected with the connector through a first joint.

19 Claims, 11 Drawing Sheets

ACTIVE ROLL CONTROL SYSTEM

CROSS-REFERENCE TO RELATED APPLICATION

The present application claims priority to Korean Patent Application No. 10-2011-0132820 and 10-2011-0132868 filed in the Korean Intellectual Property Office on Dec. 12, 2011, the entire contents of which is incorporated herein for all purposes by this reference.

BACKGROUND OF THE INVENTION

1. Field of the Invention

The present invention relates to an active roll control system for a vehicle. More particularly, the present invention relates to an active roll control system (ARCS) which can actively control roll of a stabilizer bar connected to a pair of upper arms mounted respectively at both sides of a vehicle body through stabilizer links.

2. Description of Related Art

Generally, a suspension system of a vehicle connects an axle to a vehicle body so as to control vibration or impact transmitted from a road to the axle when driving not to be directly transmitted to the vehicle body. Accordingly, the suspension system of a vehicle prevents the vehicle body and freight from being damaged and improves ride comfort.

Figure 1:
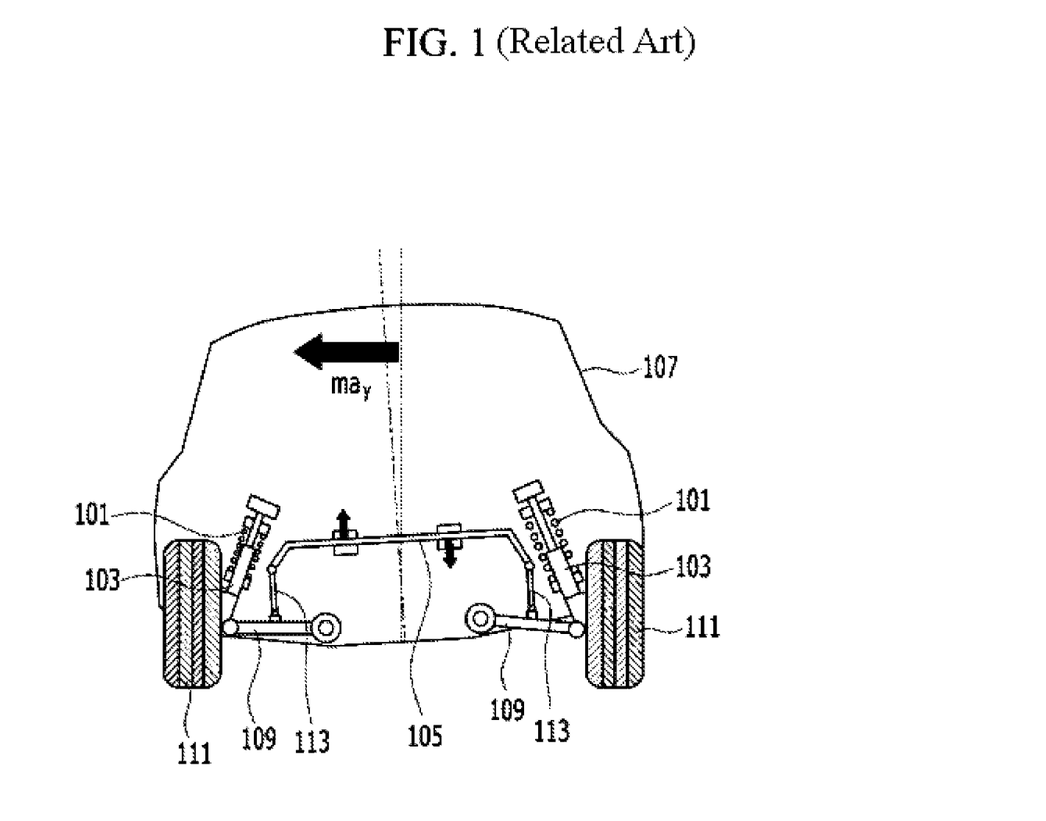
FIG. 1 is a schematic diagram of a conventional suspension system for a vehicle.

Such a suspension system, as shown in FIG. 1, includes a chassis spring 101 relieving impact from the road, a shock absorber 103 reducing free vibration of the chassis spring 101 and improving the ride comfort, and a stabilizer bar 105 suppressing roll of a vehicle (it means that a vehicle inclines with reference to a length direction of the vehicle body).

Herein, the stabilizer bar 105 includes a straight portion and both ends. Both sides of the straight portion are mounted at the vehicle body 107, and the both ends are mounted at a lower arm 109 or a strut bar that is a suspension arm through the stabilizer link 113. Therefore, in a case that left and right wheels 111 move to the same direction (upward direction or downward direction), the stabilizer bar 105 does not work. On the contrary, in a case that the left and right wheels 111 move to the opposite direction (one moves upwardly and the other moves downwardly), the stabilizer bar 105 is twisted and suppresses the roll of the vehicle body 107 by torsional restoring force.

That is, when the vehicle body 107 inclines toward a turning axis by the centrifugal force in a case of turning or heights of the left and right wheels is different from each other by bump or rebound of the vehicle, the stabilizer bar 105 is twisted and stabilizes position of the vehicle body by torsional restoring force.

Since a conventional stabilizer bar 105, however, has a constant torsional rigidity, it is insufficient to secure turning stability under various driving conditions by means of torsional elastic force of the stabilizer bar 105 only.

Figure 2:
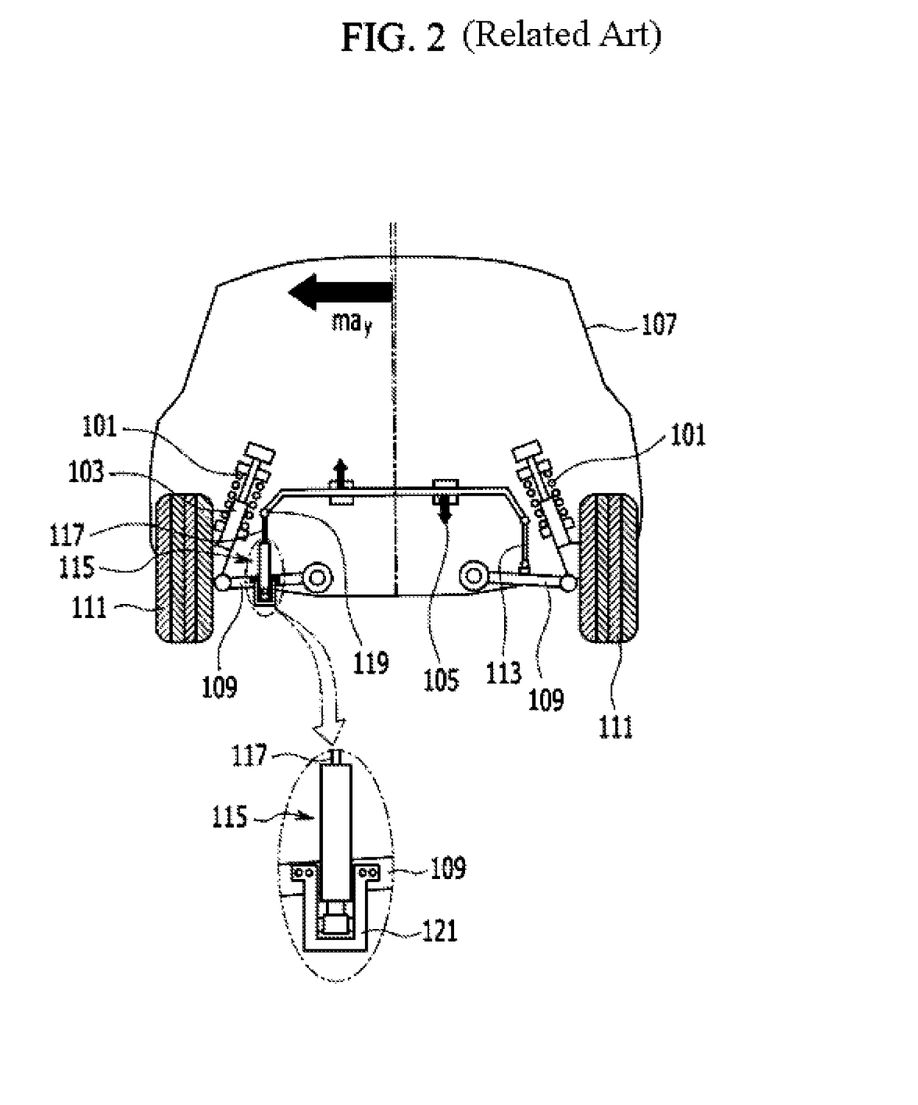
FIG. 2 is a schematic diagram of a suspension system for a vehicle to which an active roll control system for the vehicle according to conventional arts is applied.

Recently, an active roll control system having an actuator including a hydraulic pressure cylinder 115 and connected to an end of the stabilizer bar 105 so as to control roll actively has been developed as shown in FIG. 2.

The active roll control system uses the hydraulic pressure cylinder 115 instead of the stabilizer link 113 connecting the lower arm 109 and the end of the stabilizer bar 105 so as to change a connecting length between the end of the stabilizer bar 105 and the lower arm 109. Therefore, torsional rigidity of the stabilizer bar 105 is changed.

That is, a lower end of the hydraulic pressure cylinder 115 is connected to the lower arm 109 and a front end of a piston rod 117 of the hydraulic pressure cylinder 115 is connected to the end of the stabilizer bar 105 through a ball joint 119 according to the active roll control system.

According to the active roll control system, an electronic control unit (ECU) controls a hydraulic pressure system including valves, hydraulic pressure pumps, and so on based on signals output from an acceleration sensor, a height sensor, and a steering sensor of the vehicle so as to enhance roll of the vehicle.

The lower end of the hydraulic pressure cylinder 115, however, should be assembled through a separate bracket 121 having a lower end protruded under the lower arm 109 so as to secure an operation stroke of the hydraulic pressure cylinder 115 (i.e., actuator) to the maximum. Such a layout can be designed but productivity may be deteriorated.

Since the hydraulic pressure cylinder 115 is used as the actuator, components for generating and delivering hydraulic pressure (i.e., hydraulic pressure pumps, hydraulic pressure lines, valves and so on) should be necessary.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an active roll control system having advantages of actively controlling roll stiffness of a vehicle by controlling a mounting position of a stabilizer link on a suspension arm through a driving unit disposed at a side portion of the suspension arm and driven by a motor so as to change the mounting position of the stabilizer link.

According to another aspect of the present invention, an active roll control system which can be easily controlled and may have a handy layout when being mounted on a suspension arm is provided.

According to other aspect of the present invention, an active roll control system which minimize friction by applying a ball joint to a connecting portion of a stabilizer link and roller bearings to a connector so as to enhance operation efficiency.

In an aspect of the present invention, an active roll control system that is adapted to actively control roll stiffness of a vehicle by adjusting a mounting position of a stabilizer link connecting a suspension arm with a stabilizer bar of the vehicle on the suspension arm according to a driving condition of the vehicle, may include a driving unit including a housing connected with a side of the suspension arm, a rail plate disposed within the housing, and a connector slidably received in the rail plate and movable along the rail plate, and the stabilizer link of which one end is connected with an end of the stabilizer bar and the other end is pivotally connected with the connector through a first joint.

The housing is opened to upward, a side of the housing being engaged with the suspension arm, and an end of the housing being connected with a knuckle through a second joint, wherein a guide rail is formed to the rail plate, wherein the driving unit may further include a drive motor which may have a screw shaft disposed along a length direction of the rail plate, and mounted to the housing, wherein the connector is engaged with the screw shaft through a screw hole formed at a lower portion thereof within the rail plate, and is slidably supported by the rail plate through roller bearings connected thereto, and to an upper portion of which the first joint is mounted thereto, and wherein a cover is mounted on an upper portion of the housing opened upward and may include a slot corresponding an operation distance of the connector.

The suspension arm is a lower arm which is connected with a sub frame and the knuckle of the vehicle.

The first joint is a ball joint and a ball stud of the ball joint is assembled to an upper portion of the connector by press-fitting or orbital forming.

A nut housing is integrally formed to the end of the stabilizer link and is screw-engaged with the first joint.

The second joint is a ball joint.

A space is formed to a center of the rail plate and the screw shaft is disposed to the space.

The rail plate and the housing are engaged by a bolt.

An end of the screw shaft is supported by a bearing press-fitted to the housing.

The drive motor is a servo motor, rotation speed and rotating direction of which can be controlled.

The roller bearings are connected to sides of the connector as a pair.

In another aspect of the present invention, an active roll control system including a stabilizer bar adapted to actively control roll stiffness of a vehicle according to a driving condition of the vehicle, may include a suspension arm of which a penetrating slot is formed along up and down direction thereof, a driving unit including a housing mounted to an lower portion of the penetrating slot of the suspension arm, a rail plate disposed within the housing, and a connector disposed along the rail plate within the housing, the driving unit selectively moving the connector along the rail plate linearly along the rail plate, and a stabilizer link of which an upper end is connected to an end of the stabilizer bar, a lower portion of which is curved and a lower end of which is connected with the connector by a joint through the penetrating slot.

The penetrating slot is formed near an inward portion of a chassis spring support portion on the suspension arm.

A cover of which a slot corresponding to an operation distance of the connector is formed thereto is engaged to an upper portion of the penetrating slot on the suspension arm.

The housing is opened to upward, wherein a guide rail is formed to the rail plate, wherein the driving unit may further include a drive motor having a screw shaft as a rotation shaft disposed along a length direction of the rail plate and engaged with the housing, wherein the connector is engaged with the screw shaft through a screw hole formed at a lower portion thereof within the rail plate, wherein roller bearings are disposed to sides of the connector and slidably guided by the guide rails, and wherein an upper portion of the connector is connected to the lower end of the stabilizer link through a ball joint.

A ball stud of the ball joint is assembled to the upper portion of the connector by press-fitting or orbital forming.

A space is formed to a center of the rail plate and the screw shaft is disposed to the space.

An end of the screw shaft is supported by a bearing press-fitted to the housing.

The drive motor is a servo motor, rotation speed and rotating direction of which can be controlled.

The roller bearings are connected to the sides of the connector as a pair.

The suspension arm is a lower arm which is connected with a sub frame and a knuckle of the vehicle.

In an exemplary embodiment of the present invention, an active roll control system may actively control roll stiffness of a vehicle by controlling a mounting position of a stabilizer link on a suspension arm so as to turning stability of a vehicle may be enhanced.

Particularly, in turning of a vehicle, a mounting position of a stabilizer link is moved to a position at a suspension arm moving range, and thus further roll stiffness may be realized.

Also, by driving a motor, a hydraulic pressure supply system including a hydraulic pressure pump, a hydraulic pressure valve, a hydraulic pressure pipe and so on is not required for hydraulic pressure supply control, and thus layout may be enhanced.

A connector is applied with a ball joint for connecting with a stabilizer link and roller bearings for moving along a rail plate and thus friction may be reduced and operation efficiency may be enhanced.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

Description of components that are not necessary for explaining the present invention clearly will be omitted and the first and second may be used for the same elements, however it is not limited to the order thereof.

Figure 3:
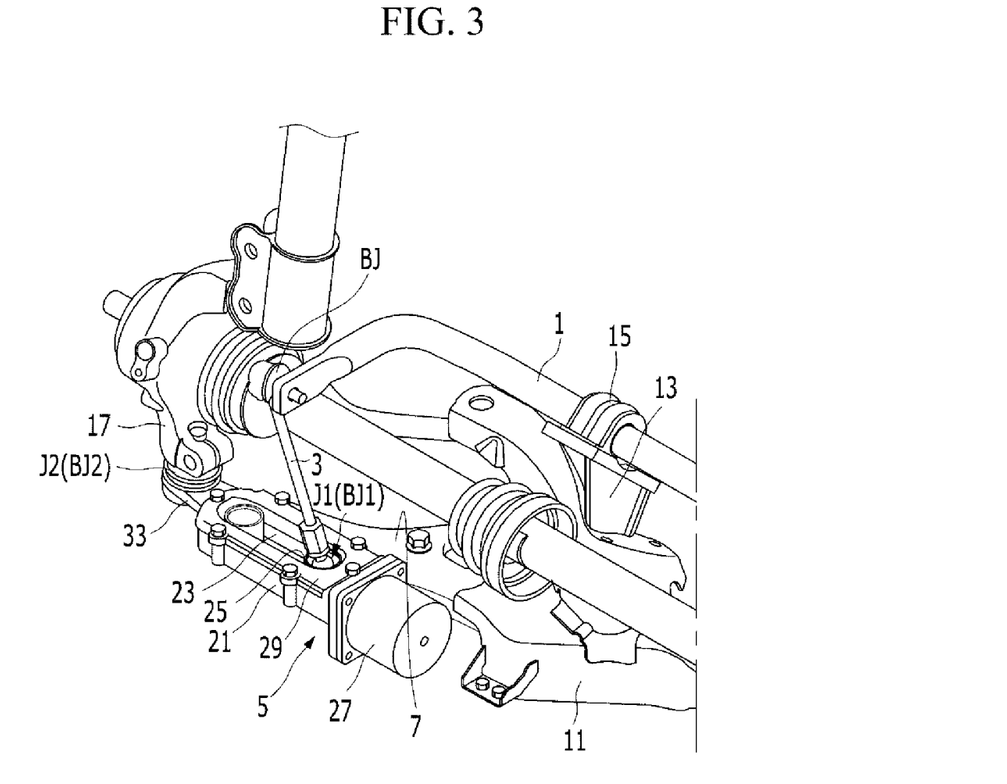
FIG. 3 is a perspective view of an active roll control system according to the various exemplary embodiments of the present invention.

For convenience of explaining an exemplary embodiment of the present invention, the left side will be called an outboard side and the right side will be called an inboard side in FIG. 3.

Figure 4:
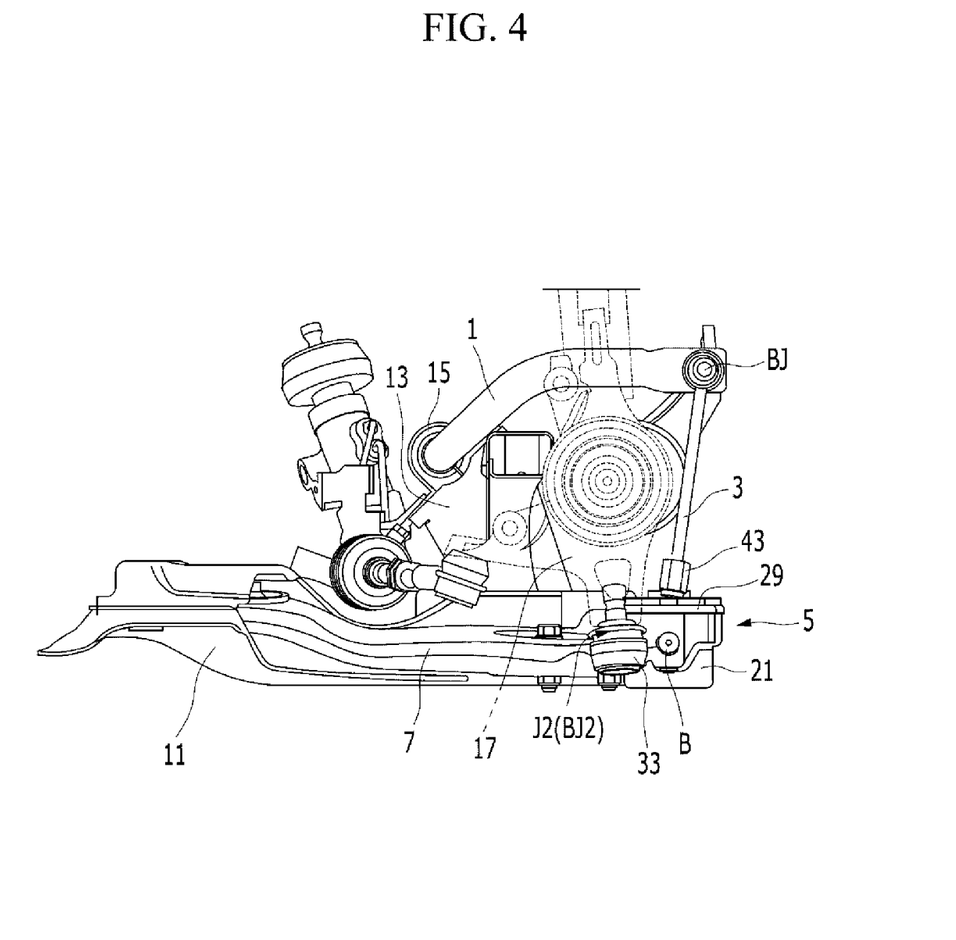
FIG. 4 is a front view of an active roll control system according to the various exemplary embodiments of the present invention.
Figure 5:
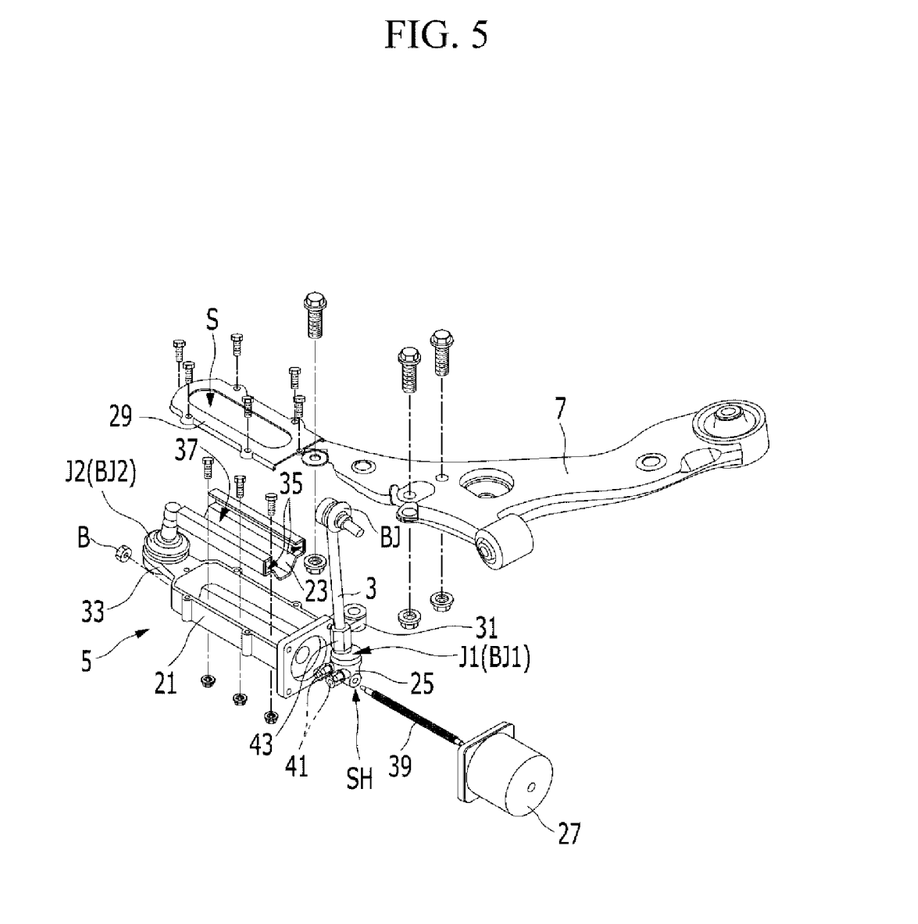
FIG. 5 is an exploded perspective view of an active roll control system according to the various exemplary embodiments of the present invention.

FIG. 3 is a perspective view of an active roll control system according to the various exemplary embodiments of the present invention, FIG. 4 is a front view of an active roll control system according to the various exemplary embodiments of the present invention, and FIG. 5 is an exploded perspective view of an active roll control system according to the various exemplary embodiments of the present invention.

Referring to FIG. 3 and FIG. 4, an active roll control system according to the various exemplary embodiments of the present invention includes a stabilizer bar 1, a stabilizer link 3 and a driving unit 5 disposed on a lower arm 7 that is a suspension arm.

Herein, the stabilizer bar 1 includes a straight portion and both ends.

Both sides of the straight portion of the stabilizer bar 1 are mounted at a bracket 13 on the sub frame 11 through a mounting bushing 15.

An upper end of the stabilizer link 3 is connected to an end of the stabilizer bar 1 though a ball joint BJ respectively.

The driving unit 5 is connected to a side of the lower arm 7 that is the suspension arm through a housing 21, and linearly moves a connector 25 connected to a lower end of the stabilizer link 3 along a rail plate 23 within the housing 21 by operation of a motor 27.

Hereinafter, referring to FIG. 5, the driving unit 5 will be described in detail.

The driving unit 5 includes the housing 21, the rail plate 23, the drive motor 27, the connector 25 and a cover 29.

The housing 21 is opened to upward and engaged with a side of the lower arm 7 by a bolt.

Within the housing 21, guide rails 35 are formed to the rail plate 23.

A space 37 is formed between the guide rails 35 along the length direction thereof shaped as "V".

A lower portion of the rail plate 23 is engaged with the housing 21 by a bolt.

The drive motor 27 is engaged within the housing 21 and a rotary shaft thereof is formed as a screw shaft 39, and the screw shaft 39 is disposed to the space 23 of the rail plate 23 penetrating the housing 21.

An end of the screw shaft 39 is rotatably supported by a bearing B press-fitted to the housing 21.

The drive motor 27 is a servo motor, rotation speed and rotating direction of which can be controlled.

Figure 6:
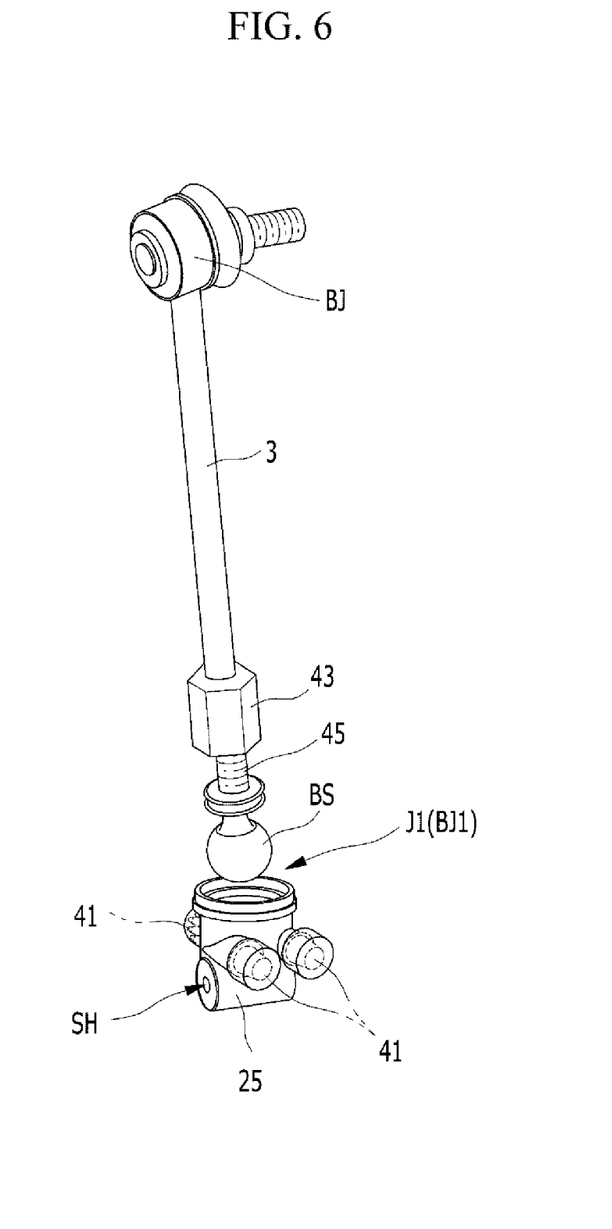
FIG. 6 is a perspective view of a stabilizer link and a connector for a vehicle to which an active roll control system for the vehicle according to the various exemplary embodiments of the present invention.

Referring to FIG. 6, a screw hole SH is formed to a lower portion of the connector 25, and roller bearings 41 are disposed to sides of the connector 25.

The connector 25 is engaged with the screw shaft 39 through a screw hole SH within the rail plate 23.

The connector 25 is slidably supported by the guide rails 35 of the rail plate 23 through the roller bearings 41.

At this time, a pair of roller bearings 41 is mounted at an upper portion of the connector 25 and a pair of roller bearings 41 is mounted at a lower portion of the connector 25. However, the number of the roller bearings 41 can be set arbitrarily.

The connector 25 is connected with a lower end of the stabilizer link 3 through a first joint J1.

The first joint J1 may be a ball joint BJ1, and a ball stud of the ball joint BJ1 is assembled to an upper portion of the connector 25 by press-fitting or orbital forming.

A nut housing 43 is integrally formed to an end of the stabilizer link 3 and is screw-engaged with a bolt portion of the first joint J1.

A slot S is formed to the cover 29 corresponding to operation distance of the connector 25, and the cover 29 is engaged with the opened upper portion of the housing 21.

The connector 25 and the stabilizer link 3 are connected through the slot S of the cover 29, and the cover 29 and the housing 21 are engaged by a bolt.

The active roll control system controls the mounting position of the stabilizer link 3 on the lower arm 7 according to driving condition of a vehicle by driving the drive motor 27 of the driving unit 5 mounted to the side of the lower arm 7.

Since the mounting position of the stabilizer link 3 is changed, the roll stiffness of a vehicle due to the stabilizer bar 1 may be enhanced. That is, resistance characteristic against roll of a vehicle may be enhanced and thus turning stability may be improved.

A protruded portion 33 is formed to an end of the housing 21 and is connected to a lower portion of a knuckle 17 through a second joint J2. The second joint J2 may be a ball joint BJ2.

Figure 7:
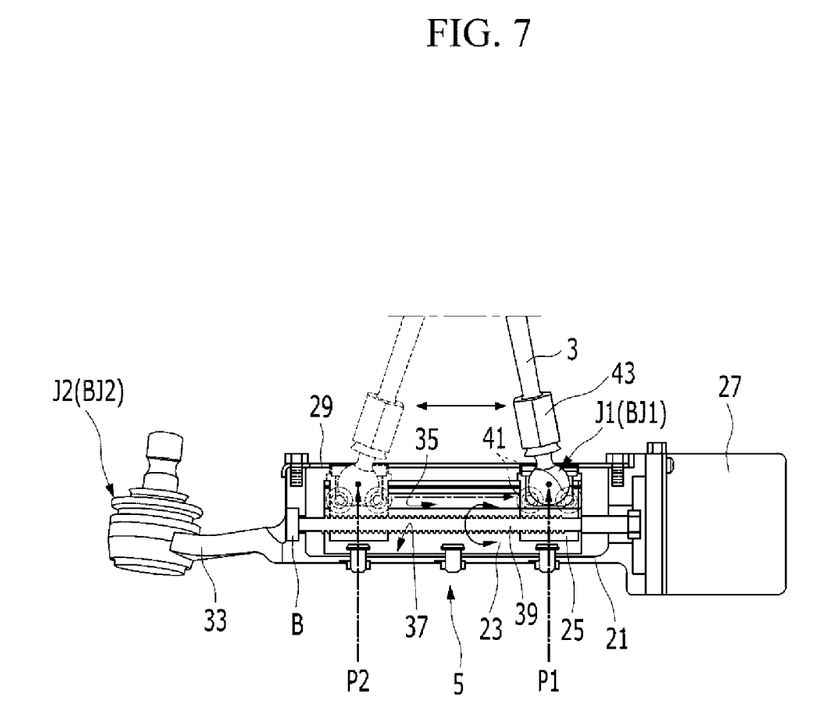
FIG. 7 is a schematic diagram for showing an operation of an active roll control system according to the various exemplary embodiments of the present invention.

Referring to FIG. 7, operations of the active roll control system according to the various exemplary embodiments of the present invention will be described.

In a case that the vehicle runs straight, the connector 25 determining the mounting position of the stabilizer link 3 on the lower arm 7 is positioned at an initial position P1 as shown in FIG. 7.

If the vehicle turns at this state, a controller controls the drive motor 27 to rotate in one direction based on signals output from an acceleration sensor, a height sensor, and a steering sensor.

Then, the connector 25 on the screw shaft 39 moves to "P2" in FIG. 7, the connector 25 determining the mounting position of stabilizer link 3 on the lower arm 7 is positioned at P2, and thus a total roll stiffness of a vehicle due to the stabilizer bar 1 is enhanced. That is, since resistance characteristic against the roll is increased and thus turning stability of the vehicle may be enhanced.

As described above, in an exemplary embodiment of the present invention, the active roll control system may actively adjust the mounting position of the stabilizer link 3 on the lower arm 7 by driving the drive motor 27 according to the driving condition of a vehicle, and thus the roll stiffness of a vehicle may be enhanced.

When the vehicle turns, the mounting position of the stabilizer link 3 on the lower arm 7 is changed, and thus the more resistance characteristic against the roll may suppress the roll of the vehicle body actively.

Also, by driving the motor 27, a hydraulic pressure supply system including a hydraulic pressure pump, a hydraulic pressure valve, a hydraulic pressure pipe and so on is not required for hydraulic pressure supply control, and thus layout may be enhanced.

The connector 25 is applied with the ball joint BJ1 for connecting with the stabilizer link 3 and the roller bearings 41 for moving along the rail plate 23 and thus friction may be reduced and operation efficiency may be enhanced.

Figure 8:
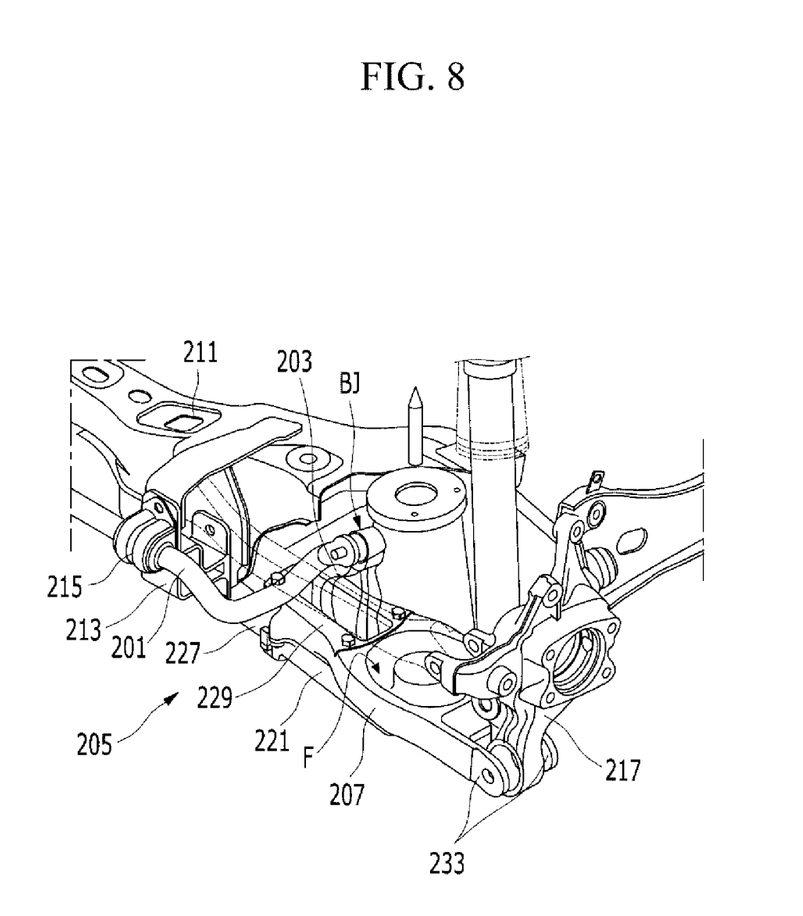
FIG. 8 is a perspective view of an active roll control system according to the various exemplary embodiments of the present invention.
Figure 9:
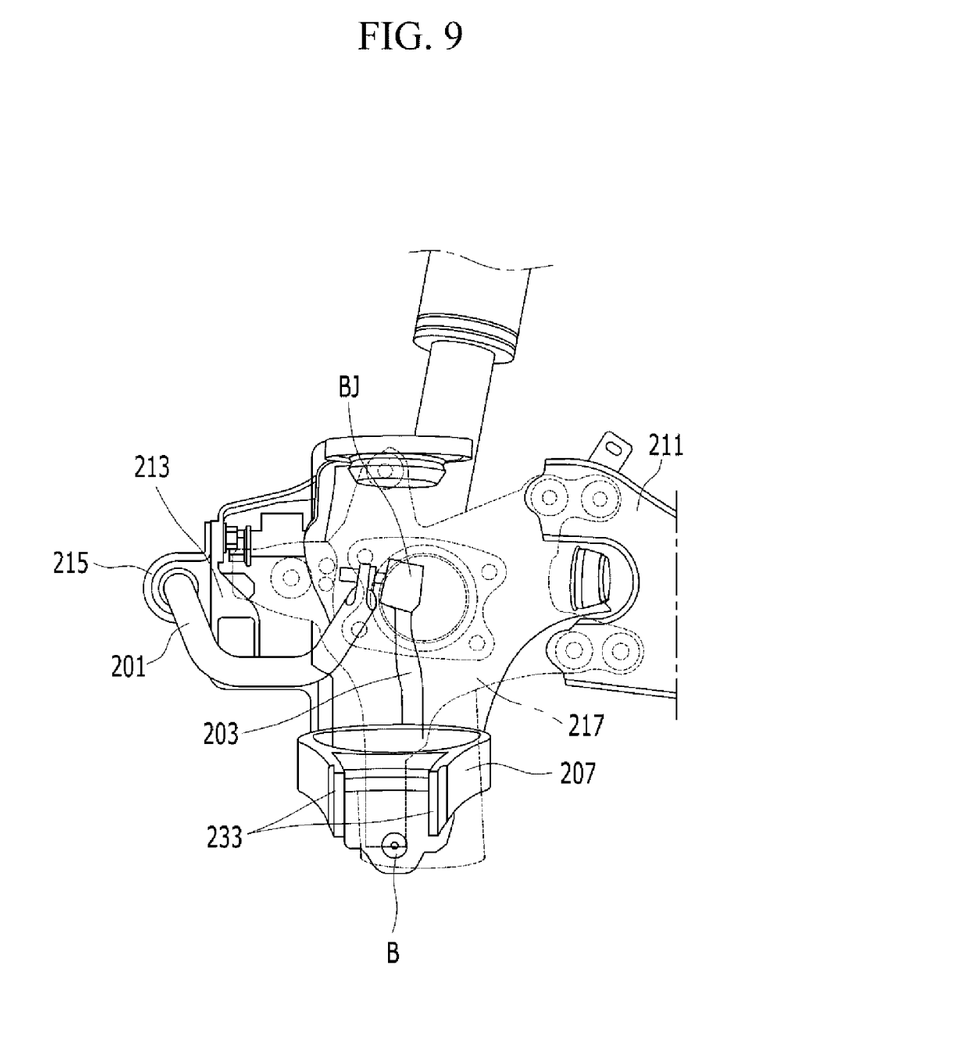
FIG. 9 is a front view of an active roll control system according to the various exemplary embodiments of the present invention.
Figure 10:
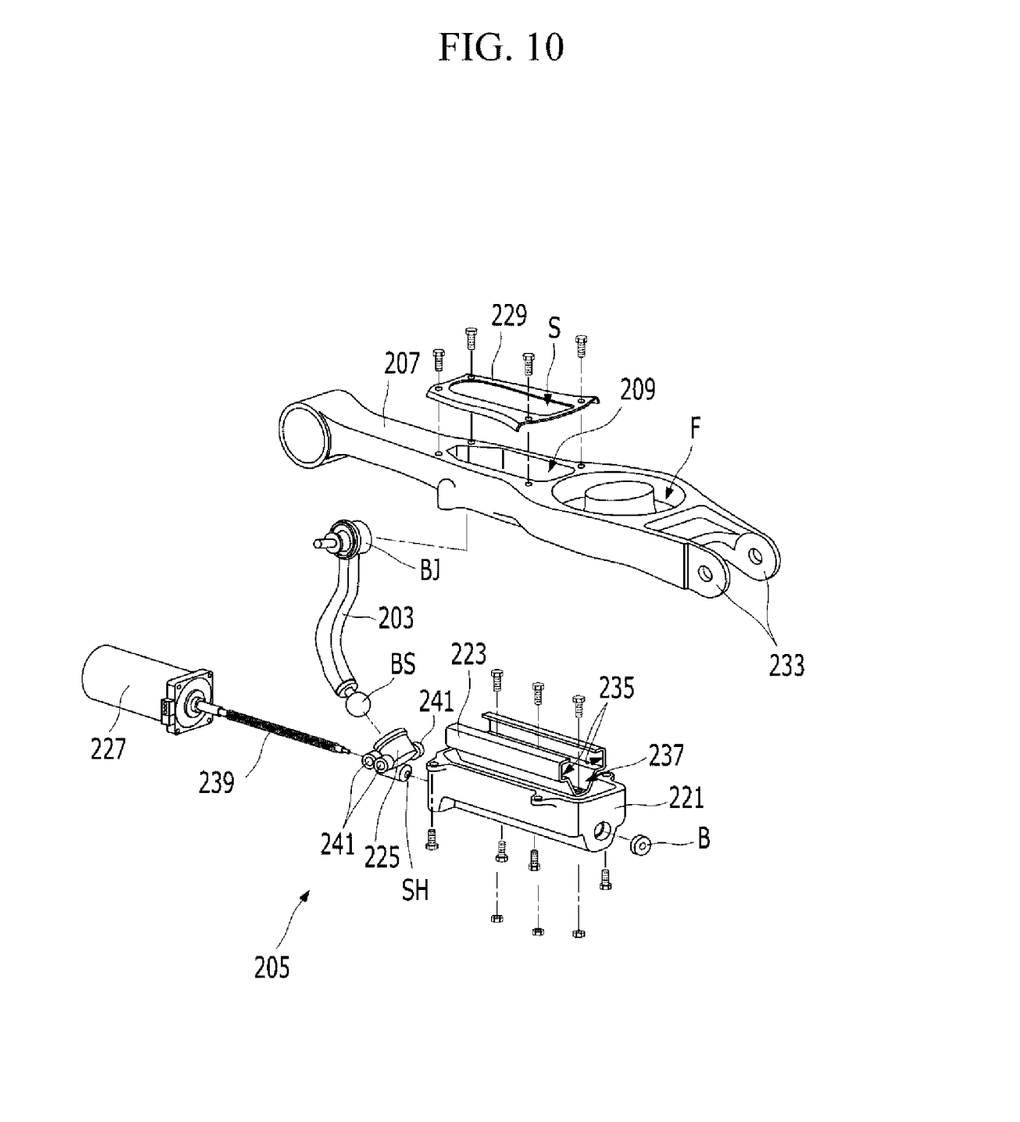
FIG. 10 is an exploded perspective view of an active roll control system according to the various exemplary embodiments of the present invention.

FIG. 8 is a perspective view of an active roll control system according to the various exemplary embodiments of the present invention, FIG. 9 is a front view of an active roll control system according to the various exemplary embodiments of the present invention, and FIG. 10 is an exploded perspective view of an active roll control system according to the various exemplary embodiments of the present invention.

Referring to FIG. 8 to FIG. 10, an active roll control system according to the various exemplary embodiments of the present invention includes a stabilizer bar 201, a stabilizer link 203 and a driving unit 205 disposed on a lower arm 207 that is a suspension arm.

Herein, the stabilizer bar 201 includes a straight portion and both ends.

Both sides of the straight portion of the stabilizer bar 201 are mounted at a bracket 213 on the sub frame 211 through a mounting bushing 215.

An upper end of the stabilizer link 203 is connected to an end of the stabilizer bar 201 though a ball joint BJ respectively.

An outward end of the lower arm 207 is connected to a lower portion of a knuckle 217 through a protruded portion 233, and a penetrating slot 209 is formed up and down direction of the lower arm 207. The penetrating slot 209 is positioned near an inward portion of a chassis spring support portion F on the lower arm 207.

The driving unit 205 is mounted to a lower portion of the penetrating slot 209 of the lower arm 207 through a housing 221, and linearly moves a connector 225 connected to a lower end of the stabilizer link 203 along a rail plate 223 within the housing 221 by operation of a motor 227.

Hereinafter, referring to FIG. 10, the driving unit 205 will be described in detail.

The driving unit 205 includes the housing 221, the rail plate 223, the drive motor 227 and the connector 225.

The housing 221 is opened to upward and engaged with a lower portion near the penetrating slot 209 by a bolt.

Guide rails 235 shaped as a pocket is formed to the rail plate 223 within the housing 221.

A space 237 is formed between the guide rails 235 along the length direction thereof shaped as "V".

A lower portion of the rail plate 223 is engaged with the housing 221 by a bolt.

The drive motor 227 is engaged within the housing 221 and a rotary shaft thereof is formed as a screw shaft 239, and the screw shaft 239 is disposed to the space 223 of the rail plate 223 penetrating the housing 221.

An end of the screw shaft 239 is rotatably supported by a bearing B press-fitted to the housing 221.

The drive motor 227 is a servo motor, rotation speed and rotating direction of which can be controlled.

A screw hole SH is formed to a lower portion of the connector 225, and roller bearings 241 are disposed to sides of the connector 225.

The connector 225 is engaged with the screw shaft 239 through a screw hole SH within the rail plate 223.

The connector 225 is slidably supported by the guide rails 235 of the rail plate 223 through the roller bearings 241.

At this time, a pair of roller bearings 241 is mounted at an upper portion of the connector 225 and a pair of roller bearings 241 is mounted at a lower portion of the connector 225. However, the number of the roller bearings 241 can be set arbitrarily.

The connector 225 is connected with a lower end of the stabilizer link 203 through a ball joint BJ.

An upper end of a stabilizer link 203 is connected to an end of the stabilizer bar 201 through a ball joint BJ, a lower portion of the stabilizer link 203 is curved and a lower end of the stabilizer link 203 is inclined connected with the connector 225 by a ball joint BJ through the penetrating slot 209.

A ball stud BS of the ball joint BJ is assembled to an upper portion of the connector 225 by press-fitting or orbital forming beforehand.

A cover 229 of which a slot S corresponding to an operation distance of the connector 225 is formed thereto is engaged to an upper portion of the penetrating slot 209 on the lower arm 207.

The connector 225 and the stabilizer link 203 are connected through the slot S of the cover 229, and the cover 229 and the housing 221 are engaged by a bolt.

The active roll control system controls the mounting position of the stabilizer link 203 on the lower arm 207 according to driving condition of a vehicle by driving the drive motor 227 of the driving unit 205 mounted to the side of the lower arm 207.

Since the mounting position of the stabilizer link 203 is changed, the roll stiffness of a vehicle due to the stabilizer bar 201 may be enhanced.

Figure 11:
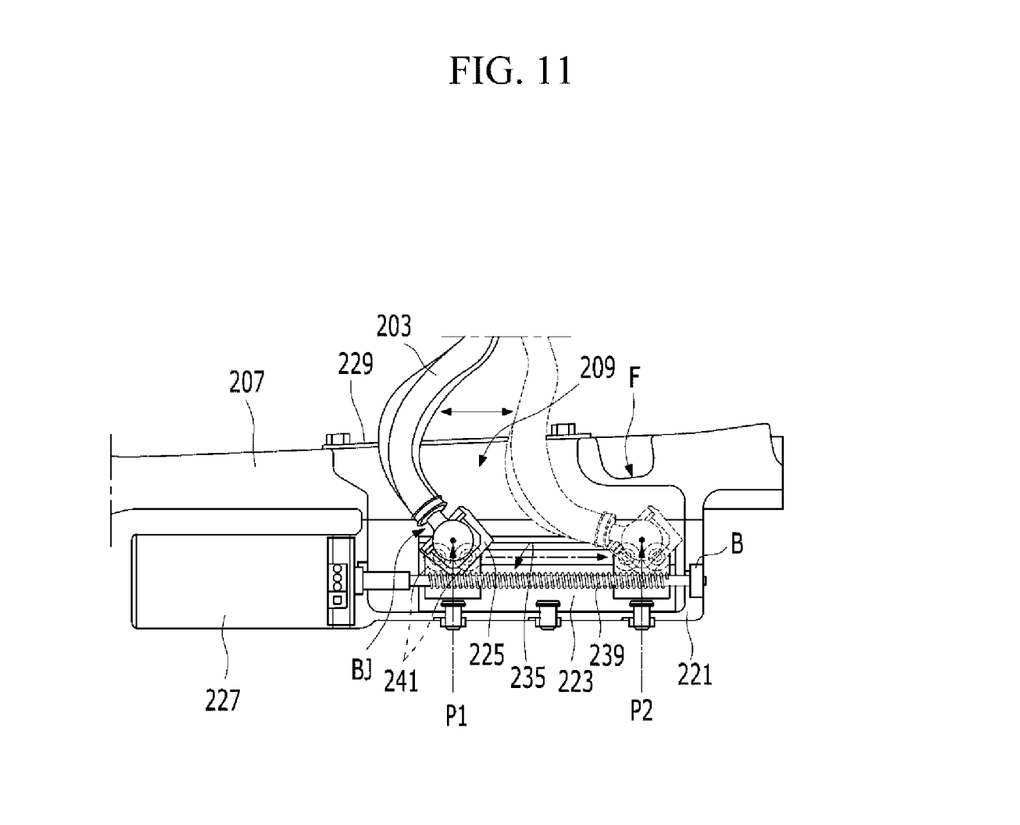
FIG. 11 is a schematic diagram for showing an operation of an active roll control system according to the various exemplary embodiments of the present invention.

Referring to FIG. 11, operations of the active roll control system according to the various exemplary embodiments of the present invention will be described.

In a case that the vehicle runs straight, the connector 225 determining the mounting position of the stabilizer link 203 on the lower arm 207 is positioned at an initial position P1 as shown in FIG. 11.

If the vehicle turns at this state, a controller controls the drive motor 227 to rotate in one direction based on signals output from an acceleration sensor, a height sensor, and a steering sensor.

Then, the connector 225 on the screw shaft 239 moves to "P2" in FIG. 11, the connector 225 determining the mounting position of stabilizer link 203 on the lower arm 207 is positioned at P2, and thus a total roll stiffness of a vehicle due to the stabilizer bar 201 is enhanced. That is, since resistance characteristic against the roll is increased and thus turning stability of the vehicle may be enhanced.

As described above, in an exemplary embodiment of the present invention, the active roll control system may actively adjust the mounting position of the stabilizer link 203 on the lower arm 207 by driving the drive motor 227 according to the driving condition of a vehicle, and thus the roll stiffness of a vehicle may be enhanced.

When the vehicle turns, the mounting position of the stabilizer link 203 on the lower arm 207 is changed, and thus the more resistance characteristic against the roll may suppress the roll of the vehicle body actively.

Also, by driving the motor 227, a hydraulic pressure supply system including a hydraulic pressure pump, a hydraulic pressure valve, a hydraulic pressure pipe and so on is not required for hydraulic pressure supply control, and thus layout may be enhanced.

Also, the stabilizer link 203 is curved, and thus a lower portion of the chassis spring support portion F may be utilized for the operation distance of the connector 225 so that the roll stiffness due to the stabilizer link 203 may be enhanced.

The connector 225 is applied with the ball joint BJ for connecting with the stabilizer link 203 and the roller bearings 241 for moving along the rail plate 223 and thus friction may be reduced and operation efficiency may be enhanced.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An active roll control system that is adapted to actively control roll stiffness of a vehicle by adjusting a mounting position of a stabilizer link connecting a suspension arm with a stabilizer bar of the vehicle on the suspension arm according to a driving condition of the vehicle, the active roll control system comprising:
   a driving unit including a housing connected with a side of the suspension arm, a rail plate disposed within the housing, and a connector slidably received in the rail plate and movable along the rail plate; and
   the stabilizer link of which one end is connected with an end of the stabilizer bar and the other end is pivotally connected with the connector through a first joint,
   wherein the housing is opened to upward, a side of the housing being engaged with the suspension arm, and an end of the housing being connected with a knuckle through a second joint,
   wherein a guide rail is formed to the rail plate,
   wherein the driving unit further includes a drive motor which has a screw shaft disposed along a length direction of the rail plate, and mounted to the housing,
   wherein the connector is engaged with the screw shaft through a screw hole formed at a lower portion thereof within the rail plate, and is slidably supported by the rail plate through roller bearings connected thereto, and to an upper portion of which the first joint is mounted thereto, and
   wherein a cover is mounted on an upper portion of the housing opened upward and includes a slot corresponding an operation distance of the connector.

2. The active roll control system of claim 1, wherein the suspension arm is a lower arm which is connected with a sub frame and the knuckle of the vehicle.

3. The active roll control system of claim 1, wherein the first joint is a ball joint and a ball stud of the ball joint is assembled to an upper portion of the connector by press-fitting or orbital forming.

4. The active roll control system of claim 1, wherein the second joint is a ball joint.

5. The active roll control system of claim 1, wherein a space is formed to a center of the rail plate and the screw shaft is disposed to the space.

6. The active roll control system of claim 1, wherein the rail plate and the housing are engaged by a bolt.

7. The active roll control system of claim 1, wherein an end of the screw shaft is supported by a bearing press-fitted to the housing.

8. The active roll control system of claim 1, wherein the drive motor is a servo motor, rotation speed and rotating direction of which can be controlled.

9. The active roll control system of claim 1, wherein the roller bearings are connected to sides of the connector as a pair.

10. An active roll control system that is adapted to actively control roll stiffness of a vehicle by adjusting a mounting position of a stabilizer link connecting a suspension arm with a stabilizer bar of the vehicle on the suspension arm according to a driving condition of the vehicle, the active roll control system comprising:
    a driving unit including a housing connected with a side of the suspension arm, a rail plate disposed within the housing, and a connector slidably received in the rail plate and movable along the rail plate; and
    the stabilizer link of which one end is connected with an end of the stabilizer bar and the other end is pivotally connected with the connector through a first joint,
    wherein a nut housing is integrally formed to the end of the stabilizer link and is screw-engaged with the first joint.

11. An active roll control system including a stabilizer bar adapted to actively control roll stiffness of a vehicle according to a driving condition of the vehicle, the active roll control system comprising:
    a suspension arm of which a penetrating slot is formed along up and down direction thereof;
    a driving unit including a housing mounted to an lower portion of the penetrating slot of the suspension arm, a rail plate disposed within the housing, and a connector disposed along the rail plate within the housing, the driving unit selectively moving the connector along the rail plate linearly along the rail plate; and
    a stabilizer link of which an upper end is connected to an end of the stabilizer bar, a lower portion of which is curved and a lower end of which is connected with the connector by a joint through the penetrating slot,
    wherein the housing is opened to upward,
    wherein a guide rail is formed to the rail plate,
    wherein the driving unit further includes a drive motor having a screw shaft as a rotation shaft disposed along a length direction of the rail plate and engaged with the housing,
    wherein the connector is engaged with the screw shaft through a screw hole formed at a lower portion thereof within the rail plate,
    wherein roller bearings are disposed to sides of the connector and slidably guided by the guide rails, and
    wherein an upper portion of the connector is connected to the lower end of the stabilizer link through a ball joint.

12. The active roll control system of claim 11, wherein the penetrating slot is formed near an inward portion of a chassis spring support portion on the suspension arm.

13. The active roll control system of claim 12, wherein the suspension arm is a lower arm which is connected with a sub frame and a knuckle of the vehicle.

14. The active roll control system of claim 11, wherein a cover of which a slot corresponding to an operation distance of the connector is formed thereto is engaged to an upper portion of the penetrating slot on the suspension arm.

15. The active roll control system of claim 11, wherein a ball stud of the ball joint is assembled to the upper portion of the connector by press-fitting or orbital forming.

16. The active roll control system of claim 11, wherein a space is formed to a center of the rail plate and the screw shaft is disposed to the space.

17. The active roll control system of claim 11, wherein an end of the screw shaft is supported by a bearing press-fitted to the housing.

18. The active roll control system of claim 11, wherein the drive motor is a servo motor, rotation speed and rotating direction of which can be controlled.

19. The active roll control system of claim 11, wherein the roller bearings are connected to the sides of the connector as a pair.

\* \* \* \* \*